United States Patent
Chen et al.

(10) Patent No.: US 6,377,535 B1
(45) Date of Patent: Apr. 23, 2002

(54) HIGH NUMERICAL APERTURE OPTICAL FOCUSING DEVICE HAVING A CONICAL INCIDENT FACET AND A PARABOLIC REFLECTOR FOR USE IN DATA STORAGE SYSTEMS

(75) Inventors: Hong Chen, San Jose; Chuan He, Fremont; Carl J. Carlson, Pleasanton; Joseph J. Miceli, Jr., Saratoga; Charles C. Cheng, Cupertino; Yugang Wang, Milpitas, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/179,279

(22) Filed: Oct. 26, 1998

Related U.S. Application Data

(63) Continuation-in-part of application No. 09/111,098, filed on Jul. 6, 1998, now Pat. No. 6,130,779.
(60) Provisional application No. 60/091,788, filed on Jul. 6, 1998, provisional application No. 60/091,784, filed on Jul. 6, 1998, and provisional application No. 60/091,787, filed on Jul. 6, 1998.

(51) Int. Cl.⁷ .............................................. G11B 7/135
(52) U.S. Cl. .................. 369/112.09; 369/13; 369/44.23; 369/112.25; 369/112.28; 369/112.1
(58) Field of Search ................................ 369/13, 44.14, 369/44.23, 112, 119, 109, 103, 118; 359/575, 565, 571

(56) References Cited

U.S. PATENT DOCUMENTS

| 5,042,928 A | 8/1991 | Richards ...................... 359/728 |
| 5,125,750 A | 6/1992 | Corle et al. .................. 350/819 |
| 5,497,359 A | 3/1996 | Mamin et al. ............ 369/44.15 |
| 5,689,480 A | 11/1997 | Kino ............................ 369/14 |
| 5,859,814 A * | 1/1999 | Kiino et al. ............. 369/44.14 |
| 5,864,430 A * | 1/1999 | Dickey et al. .............. 359/559 |
| 5,881,042 A * | 3/1999 | Knight ..................... 369/44.23 |
| 5,903,525 A * | 5/1999 | McDaniel et al. ............. 369/13 |
| 5,946,281 A * | 8/1999 | Ito et al. ...................... 369/112 |
| 5,978,139 A * | 11/1999 | Hatakoshi et al. .......... 359/565 |
| 6,055,220 A * | 4/2000 | Mamin et al. .............. 369/112 |

OTHER PUBLICATIONS

Lee, C.W., et al., "Feasibility Study on Near Field Optical Memory Using A Catadioptric Optical System", Optical Data Storage, Technical Digest Series, vol.8, pp. 137–139, May 10–13, 1998.

Mansipur, M. et al. "Parallel Processing", 42 Optics and Photonics News, pp. 42–45, Jun. 1998.

* cited by examiner

*Primary Examiner*—David Hudspeth
*Assistant Examiner*—Kim-Kwok Chu
(74) *Attorney, Agent, or Firm*—Samuel A. Kassatly

(57) ABSTRACT

An optical focusing device for focusing an incident optical beam onto a focal plane, as a focal spot. The optical focusing device includes an incident central refractive facet upon which an optical beam impinges, and a high-index glass body through which the incident optical beam passes toward a bottom reflective surface. The bottom reflective surface reflects the optical beam through the body, toward a peripheral reflector. The peripheral reflector focuses the optical beam toward a focal plane on which the focal spot is formed. The focal plane is defined within a pedestal that forms part of the optical focusing device, and that extends from the bottom reflective surface. The central facet is conically shaped for refracting the incident optical beam away from the pedestal, onto the bottom reflective surface. The peripheral reflector surrounds the central facet and can have various appropriate shapes, such as an aspherical shape or a tilted parabolic shape, which compensates for the conical factor and aberrations introduced by the central facet. The top surface includes the central facet and the peripheral facet, and can be made substantially flat using diffractive optical elements or Fresnel optics.

38 Claims, 12 Drawing Sheets

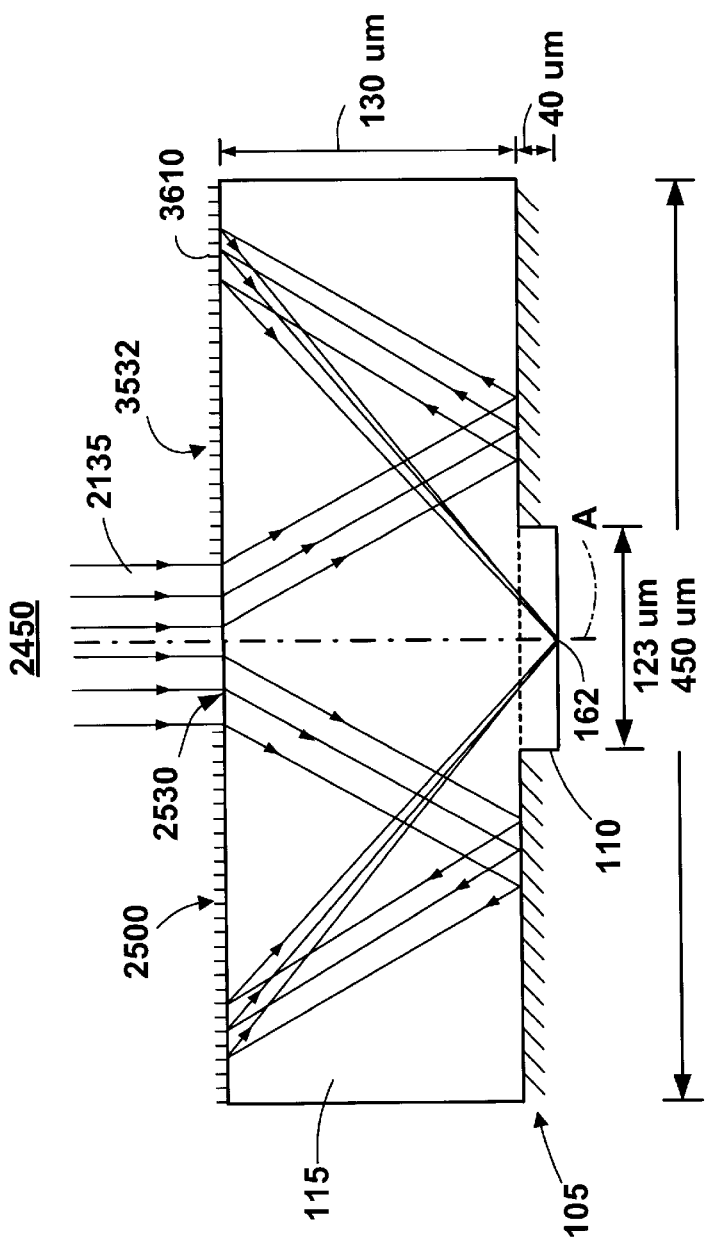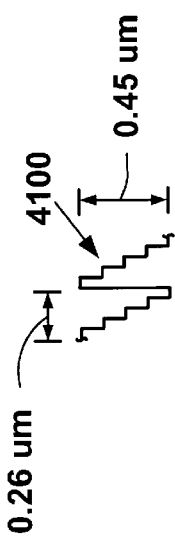

HIGH NUMERICAL APERTURE OPTICAL FOCUSING DEVICE HAVING A CONICAL INCIDENT FACET AND A PARABOLIC REFLECTOR FOR USE IN DATA STORAGE SYSTEMS

CROSS-REFERENCE TO RELATED APPLICATIONS

This is a continuation-in-part application of U.S. patent application titled "Near Field Magneto-Optical Head Made Using Wafer Processing Techniques", Ser. No. 09/111,098, filed on Jul. 6, 1998, now U.S. Pat. No. 6,130,779, issued on Oct. 10, 2000, assigned to the same assignee as the present application, which is incorporated herein by reference in its entirety.

This application further claims the priority of the following provisional U.S. patent applications, filed by the same assignee as the present application, all of which are incorporated herein by reference:

Ser. No. 60/091,788, filed on Jul. 6, 1998, and titled "High NA Solid Catadioptric Focusing device Having A Flat Kinoform Phase Profile";

Ser. No. 60/091,784, filed on Jul. 6, 1998, and titled "High NA Catadioptric Optical focusing device Having Flat Diffractive Surfaces"; and Ser. No. 60/091,787, filed on Jul. 6, 1998, and titled "Near Field Magneto-Optical Head Made Using Wafer Processing Techniques".

This application relates to U.S. patent application Ser. No. 09/179,278, titled "High Numerical Aperture Optical Focusing Device of Use in Data Storage Systems", and filed concurrently with the present application, and assigned to the same assignee as the present application.

BACKGROUND OF THE INVENTION

1. Field of the Invention

The present invention relates in general to optical focusing devices, and it particularly relates to a high numerical aperture (NA) optical focusing device. More specifically, the present invention relates to an optical focusing device having a conically shaped incident facet, for use in data storage systems such as optical and magneto-optical (MO) disk drives.

2. Description of Related Art

In a MO storage system, a thin film read/write head includes an optical assembly for directing and focusing an optical beam, such as a laser beam, and an electromagnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective has been to reduce the spot size of the light beam on the disk. The diameter of the spot size is generally inversely proportional to the numerical aperture (NA) of an objective lens forming part of the optical assembly, and proportional to the wavelength of the optical beam. As a result, the objective lens is selected to have a large NA. However, the NA in objective lenses can be 1 if the focusing spot were in air, thus limiting the spot size.

Another attempt to reduce the spot size and to increase the recording areal density has been to use solid immersion lenses (SILs) with near field recording, as exemplified by the following references:

U.S. Pat. No. 5,125,750, titled "Optical Recording System Employing a Solid Immersion Lens".

U.S. Pat. No. 5,497,359, titled "Optical Disk Data Storage System With Radiation-Transparent Air-Bearing Slider".

Yet another attempt at improving the recording head performance proposes the use of near-field optics, as illustrated by the following reference:

U.S. Pat. No. 5,689,480, titled "Magneto-Optic Recording System Employing Near Field Optics".

A catadioptric SIL system is described in the following references, and employs the SIL concept as part of the near-field optics:

Lee, C. W., et al., "Feasibility Study on Near Field Optical Memory Using A Catadioptric Optical System", Optical Data Storage, Technical Digest Series, Volume 8, pages 137–139, May 10–13, 1998; and "Parallel Processing", 42 Optics and Photonics News, pages 42–45, June 1998. While this catadioptric SIL system can present certain advantages over conventional SILs, it does not appear to capture the entire incident, collimated beam. This represents a waste of valuable energy that could otherwise increase the evanescent optical field.

Other concerns related to the manufacture of MO heads are the extreme difficulty and high costs associated with the mass production of these heads, particularly where optical and electromagnetic components are assembled to a slider body, and aligned for optimal performance.

SUMMARY OF THE INVENTION

One aspect of the present invention is to satisfy the long felt, and still unsatisfied need for a near-field optical or MO data storage system that uses an optical focusing device that has combines a conically (or axicon) shaped incident facet with a peripheral reflector or reflecting surface. According to one design, the peripheral reflector can have a shifted parabola shape. This optical focusing device captures substantially the entire incident beam and the peripheral reflector focuses it at a focal point with extremely small aberrations, thus improving the overall efficiency and performance of the data storage system.

Another aspect of the present invention is to provide an optical focusing device with relatively high manufacturing tolerance values, due largely to its simple structure and insensitivity to axial displacement of the top and bottom surfaces.

Yet another aspect of the present invention is to provide an optical focusing device with a relatively high NA by controlling the conic constant or other coefficients of the incident facet, and the peripheral facet which substantially compensate for the conical factors and the aberrations introduced by each other.

Still another aspect of the present invention is to provide an optical focusing device with quasi-flat facet using diffractive optical elements or Fresnel optics, thus making the mass production fabrication possible.

A further aspect of the present invention is to provide an optical focusing device that adds focusing power to the incident facet, by controlling certain parameters such as the angle or curvature of the incident facet.

The optical focusing device includes an incident central facet upon which an optical beam impinges, and a high-index glass body through which the incident optical beam passes toward a bottom reflective surface. The bottom reflective surface is substantially flat, and reflects the optical beam through the body, toward a peripheral reflector. The peripheral reflector focuses the optical beam toward a focal plane on which the focal spot is formed. The focal plane is defined within a pedestal that forms part of the optical focusing device, and that extends from the bottom reflective surface. The central facet is conically shaped for refracting the incident optical beam away from the pedestal, onto the bottom reflective surface. The peripheral reflector surrounds the central facet and can have various appropriate shapes, such as an aspherical shape, or a tilted parabolic shape, which compensates for the conical factor and aberrations introduced by the central facet. The top surface includes the central facet and the peripheral facet, and can be made substantially flat using diffractive optical elements or Fresnel optical elements.

In a data writing or reading mode, the incident optical beam, such as a laser beam impinges upon the central facet and is refracted or diffracted thereby. The laser beam can be collimated, convergent or divergent, and it passes through the transparent body, and impinges upon the bottom reflective surface. The laser beam is then reflected by the bottom reflective surface, through the body, onto the peripheral reflector. The laser beam is then either reflected, reflected and refracted, or reflected and diffracted by the peripheral reflector to form a focused beam at the focal point. The focal point is preferably located at, or in close proximity to a pedestal edge, along a central axis, in very close proximity to the disk. This will allow the focused optical beam to propagate toward, or penetrate the disk through evanescent wave coupling, for enabling the transduction of data to and from the disk.

BRIEF DESCRIPTION OF THE DRAWINGS

The features of the present invention and the manner of attaining them will become apparent, and the invention itself will be understood by reference to the following description and the accompanying drawings, wherein:

FIG. 13 is an enlarged, side elevational view of another optical focusing device according to the present invention, including a peripheral reflector and a central facet;

FIG. 14 is a greatly enlarged of a microstructure or grating forming part of the central facet of FIG. 13; and FIG. 15 is a greatly enlarged of a micro-structure or grating forming part of the peripheral reflector of FIG. 13.

Similar numerals in the drawings refer to similar or identical elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
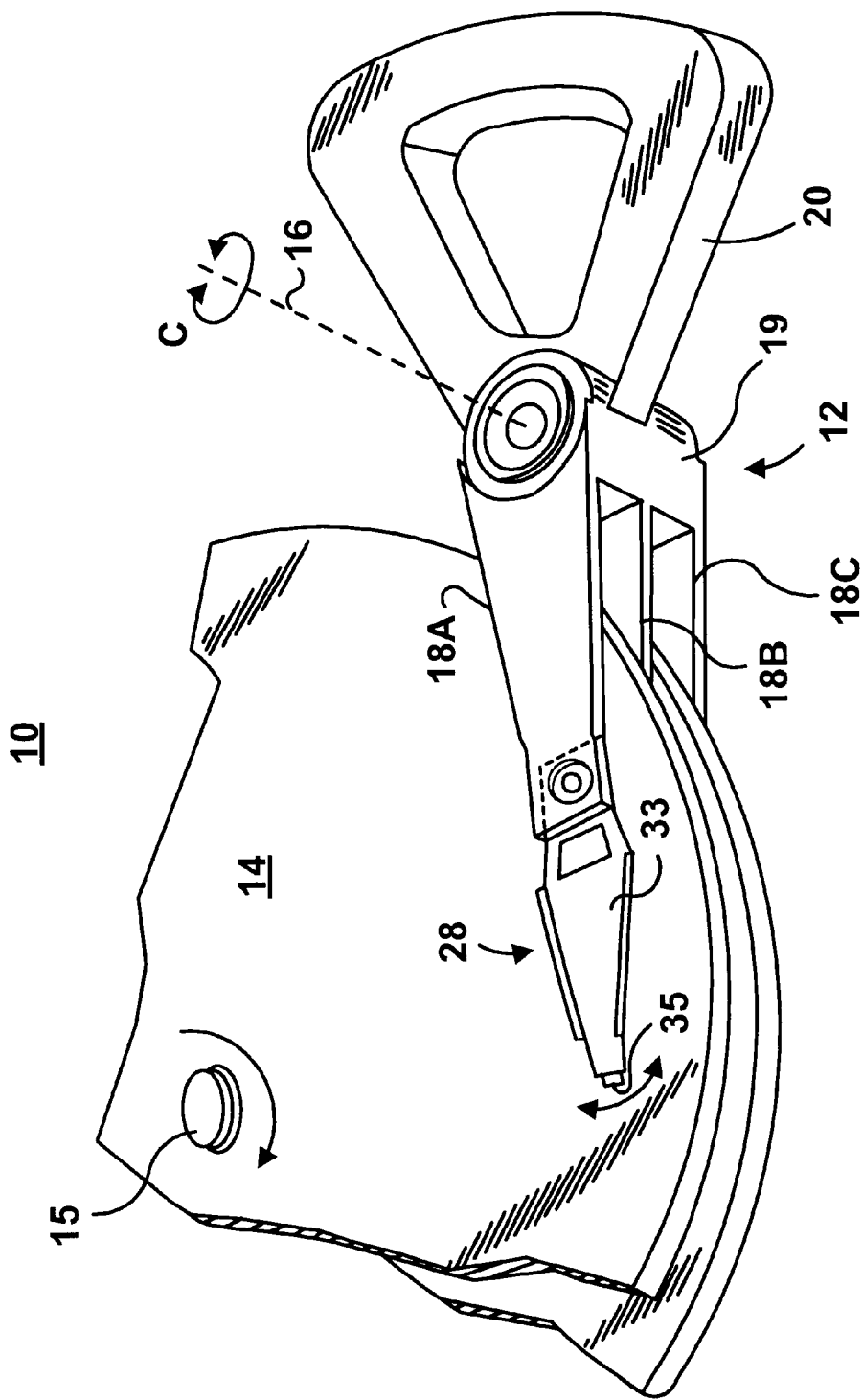
FIG. 1 is a fragmentary perspective view of a data storage system utilizing a read/write head comprised of an optical focusing device according to the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. A voice coil 20 cooperates with a stator (not shown) for rotating in an arc about the actuator axis 16. Energizing voice coil 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
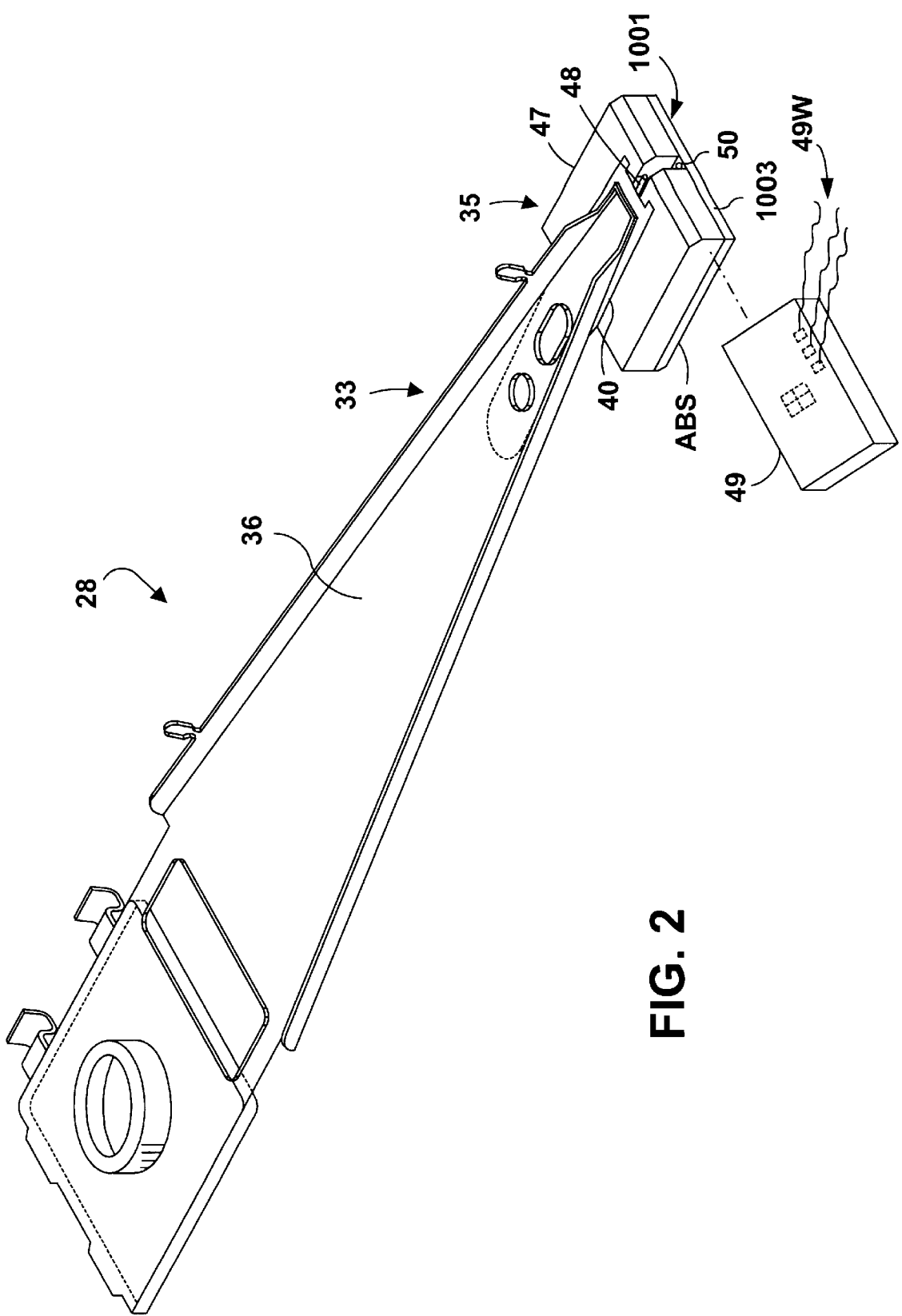
FIG. 2 is a perspective view of a head gimbal assembly comprised of a suspension and a slider to which the read/write head of FIG. 1 is secured, for use in a head stack assembly.

A head gimbal assembly (HGA) 28 is secured to each of the actuator arms, for instance 18A. With further reference to FIG. 2, the HGA 28 is comprised of a suspension 33 and a read/write head 35. The suspension 33 is formed of a load beam 36 and a flexure 40 to which the head 35 is secured.

Figure 6:
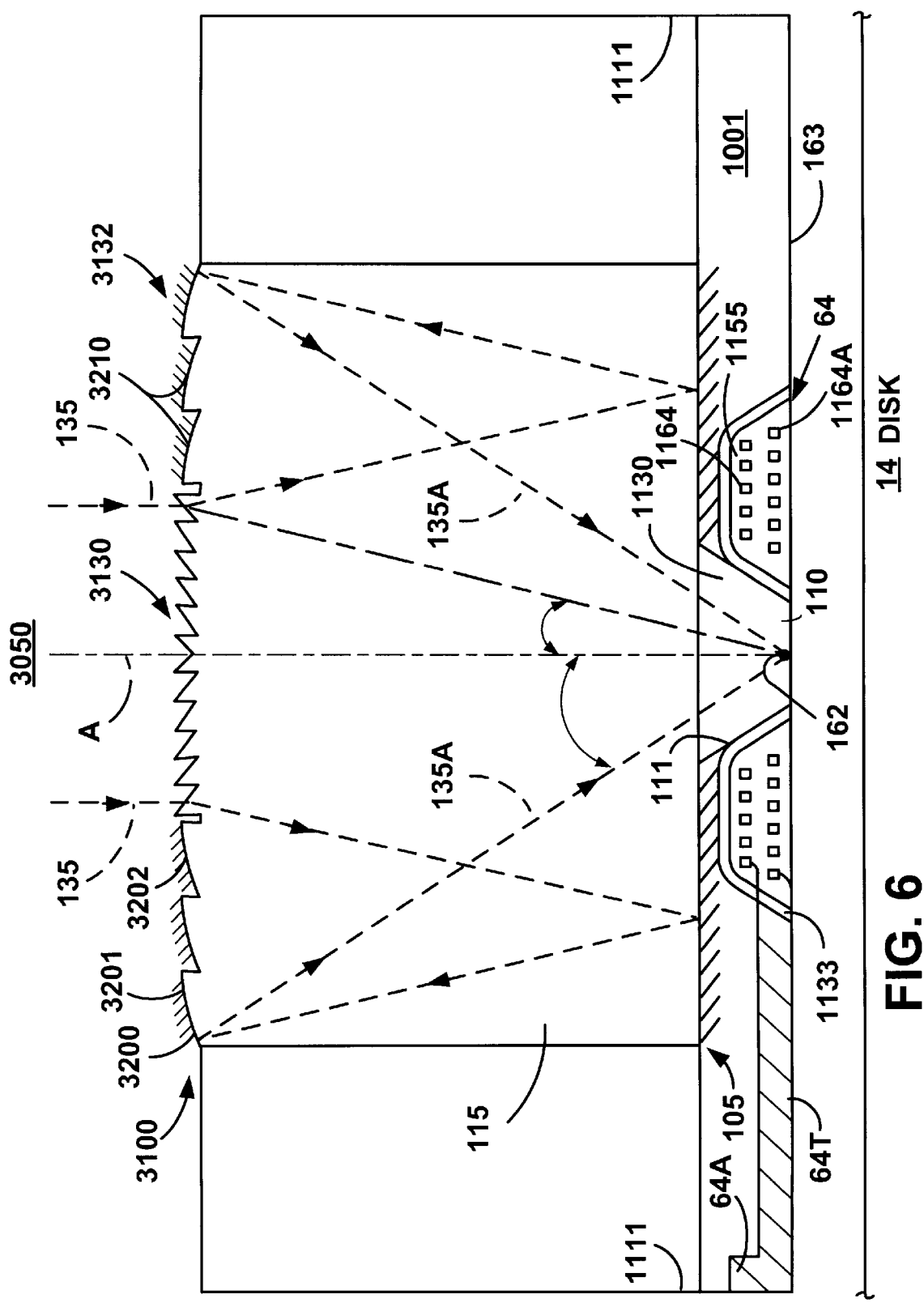
FIG. 6 is an enlarged, side elevational view of an optical focusing device forming part of the read/write head of FIGS. 1 and 2 made according to the present invention, and illustrating an optical beam path through the optical focusing device.

The head 35 is formed of a slider body (or slider) 47 that is secured to the free end of the load beam 36 by means of the flexure 40, and a lens/coil plate 1001 that is secured to the slider body 47. The lens/coil plate 1001 comprises a substrate 1003 on (or within) which an optical focusing device or lens 50, or any other optical focusing device (e.g. 2050, 2250, 2350, 2550, 3550) described herein is formed on a first (or upper) side 1004 (FIG. 4). With further reference to FIG. 6, the lens/coil plate 1001 also includes a coil or coil assembly 64 secured to a pedestal 110 for generating a desired write magnetic field. As is schematically illustrated by a block drawn in dashed lines in FIG. 3, and as it will be explained later in greater detail, the coil 64 is formed on (or within) a second (or bottom) side 1006 of the lens/coil plate 1001, opposite to, and in alignment with the optical focusing device 50.

Figure 3:
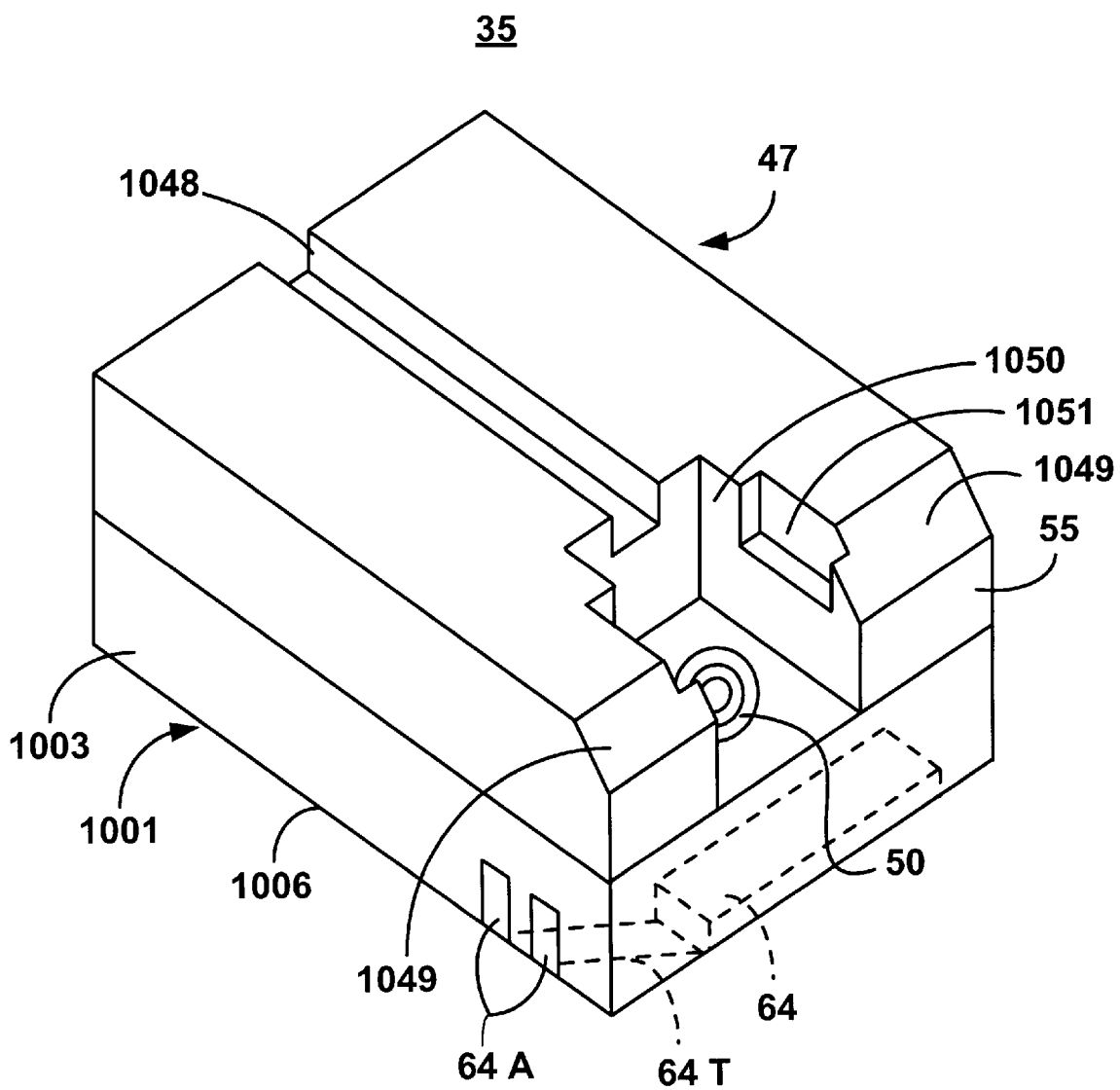
FIG. 3 is an enlarged perspective view of an assembled head showing an optical focusing device according to the present invention.
Figure 4:
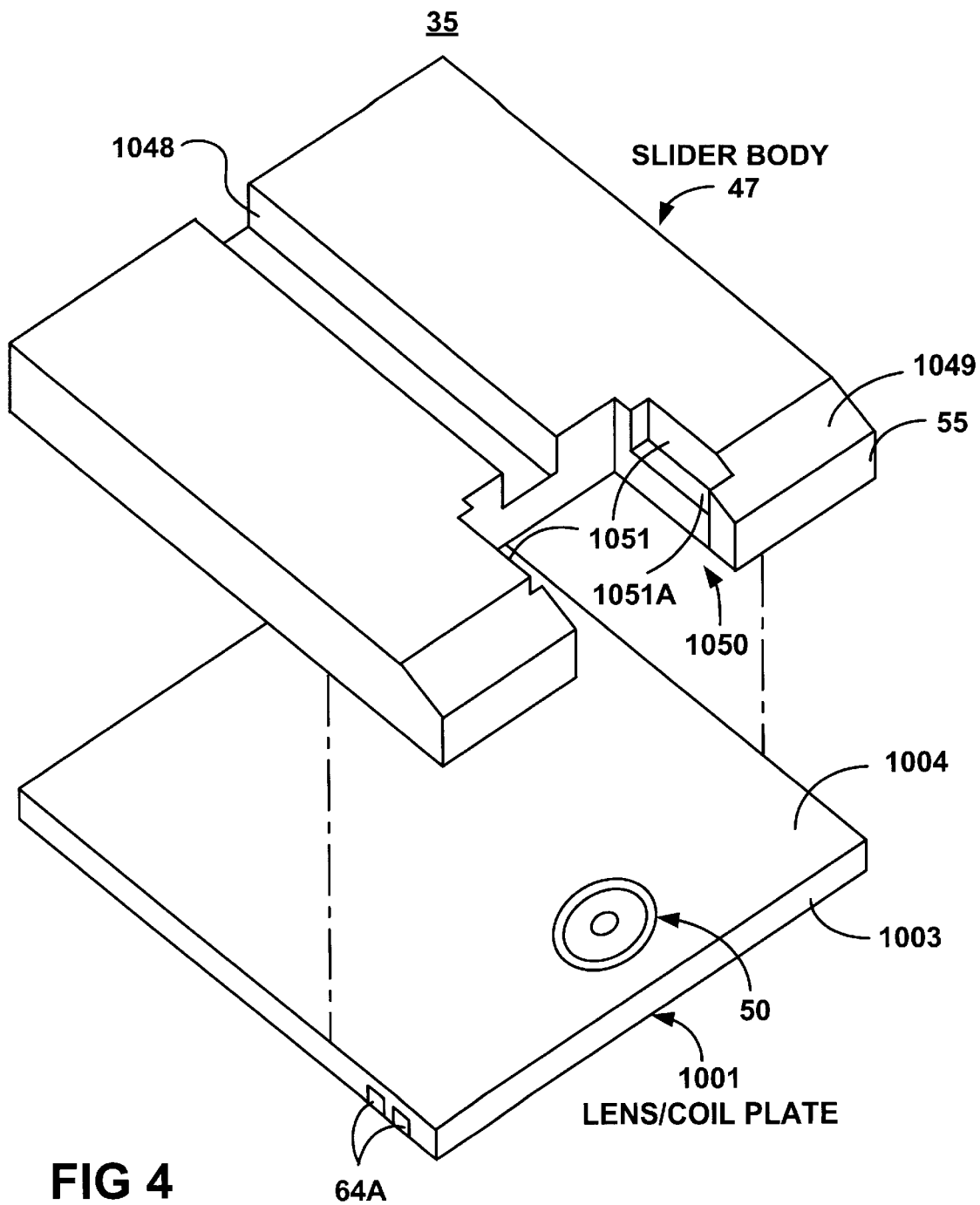
FIG. 4 is an exploded view of the head of FIG. 3, illustrating a slider body and a lens/coil plate.

With reference to FIGS. 2–4, the head 35 further includes an optical beam delivery mechanism, such as a waveguide, a channel, or a fiber 48. A stationary or a micro-machined dynamic reflective surface, such as a mirror 49, is secured to a trailing edge 55 of the slider body 47 at a 45 degree angle relative to the optical beam emanating from the fiber 48, to reflect the optical beam onto the optical focusing device 50, in order to transduce data to and from the storage medium 14 (FIG. 6).

Figure 5:
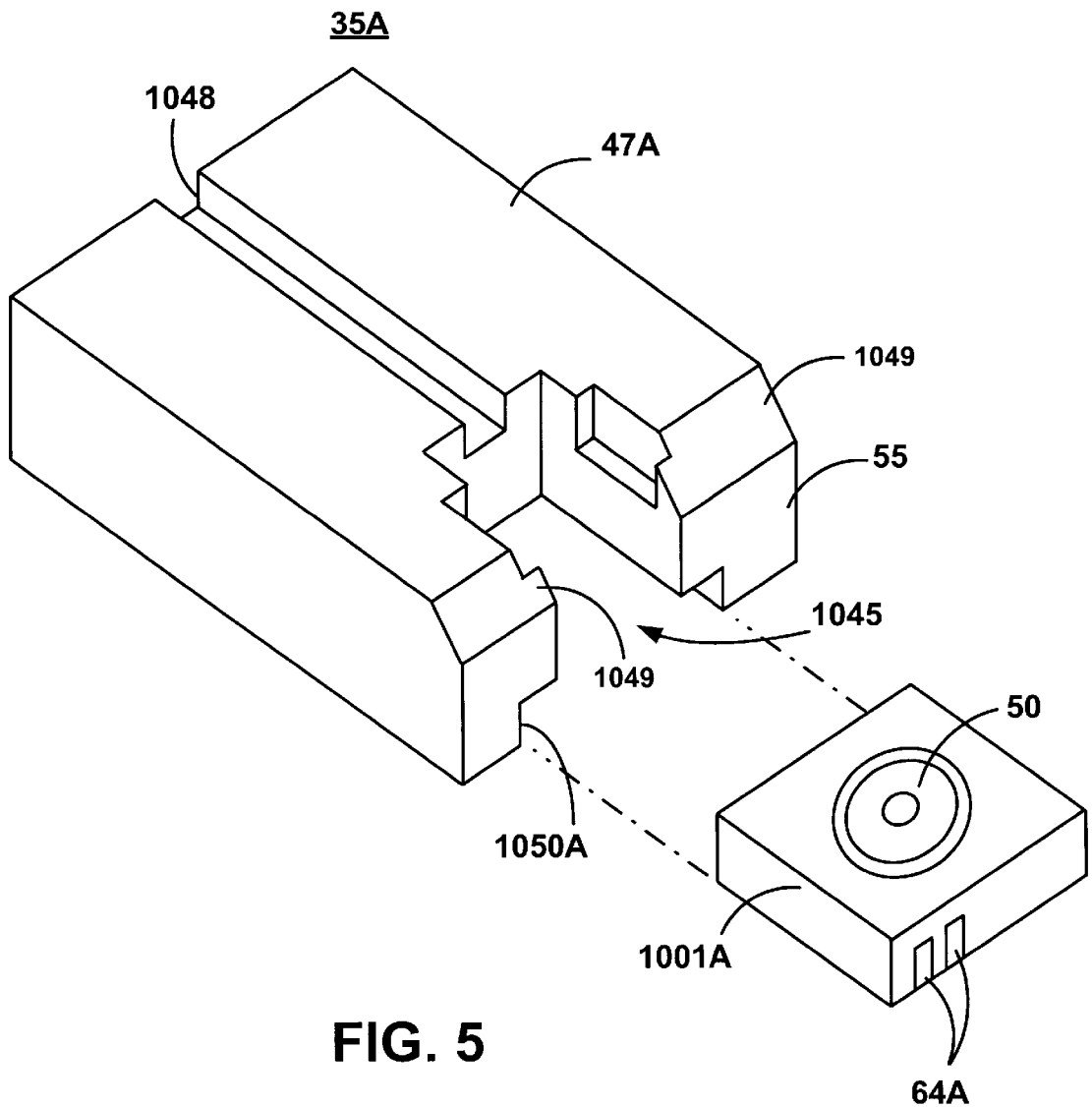
FIG. 5 is a perspective, exploded view of another head design, illustrating a slider body in the process of being assembled to an individual optical focusing device made according to the present invention.

With reference to FIGS. 4 through 5, the slider body 47 can be a conventional slider or any other suitable slider. The slider body 47 includes an optical opening 1050, which in this example, extends from, and is wider than the fiber channel 1048. The optical opening 1050 is formed in the slider trailing edge 55. The slider body 47 also includes two quarter-wave plate notches 1051 that are formed symmetrically relative to the optical opening 1050, in two opposite sides of the slider body 47. The quarter wave-plate notches 1051 cooperate to receive and retain a quarter wave-plate or any other suitable optical component that assists in guiding and focusing the optical beam 135 (FIG. 6) emanating from the optical fiber 48.

A sloped surface 1049 can be formed on one or both sides of the trailing edge 55 relative to the optical opening 1050, in order to support the mirror 49 at the desired angle, for reflecting the optical beam 135 emanating from the fiber 48, through the quarter-wave plate 1052, the optical focusing device 50, and the coil assembly 64, onto the disk 14 (FIG. 6). As illustrated in FIGS. 3 and 4, the optical opening 1050 extends through the entire height of the slider body 47.

The lens/coil plate 1001 is secured to the slider body 47, such that the optical focusing device 50 (or lens) is positioned substantially underneath the optical opening 1050, in optical alignment with the fiber 48, the mirror 49, the quarter-wave plate 1052, and the coil assembly 64. Two contact pads 64A (FIG. 3) are formed in the side of the substrate 1003 for connection to the coil assembly 64 via wire traces 64T.

FIG. 5 illustrates another head 35A which is basically similar in function to the head 35, with the exception that the head 35A includes a slider body 47A that has an opening 1050A for receiving a lens/coil plate 1001A, within or on which the optical focusing device 50 and the coil assembly 64 are formed according to the present invention. In this design, the lens/coil plate 1001A is individually fitted within the opening 1050A and secured to the slider body 47A, for example by means of epoxy.

The details of another optical focusing device 3050 will now be described with reference to FIGS. 6 through 8. The optical focusing device 3050 includes a top surface 3100, a bottom reflective surface 105, a pedestal 110, and a body 115. The top surface 3100 is generally comprised of a central facet 3130 and a peripheral reflector 3132.

In one embodiment, the central facet 3130 is diffractive and optically transmissive, and the peripheral reflector 3132 includes a diffractive or kinoform phase profile 3133. The body 115 is optically transparent, and the top surface 3100 is formed on a first side of the body 115. The bottom reflective surface 105 is formed on a second side of the body 115, with the first and second sides being preferably oppositely disposed. The pedestal 110 is formed on the same side as the bottom reflective surface 105.

The optical focusing device 3050 is secured to the top surface of the coil wafer plate 1001 which includes a magnetic pole 1133, a coil 1164, and dielectric material 1155.

The focused beam 135A defines an angle of incidence θ with a central axis A. It should be clear that the angle of incidence θ is greater than the angle of incidence θ' had the optical beam 135 not undergone the sequence of reflection, refraction, and/or diffraction as explained herein. Consequently, the NA of the optical focusing device 3050 exceeds that of a conventional objective lens, as supported by the following equation:

$$NA = n \sin \theta,$$

where n is the index of refraction of the lens body 115. According to the present invention, it is now possible to select the lens body 115 of a material with a high index of refraction n, in order to increase NA.

In one embodiment, the peripheral reflector 3132 is formed of a profile such as a kinoform phase profile that defines a pattern of refractive profiles i.e., 3200, 3201, 3202. While only three refractive profiles are illustrated, it should be understood that a greater number of refractive profiles can be selected. The pattern of refractive profiles 3200, 3201, 3202 is coated with a reflective layer 3210. In another embodiment, the peripheral kinoform phase profile can be replaced with an appropriate diffractive grating or profile, or with an appropriate lens structure such as a Fresnel lens.

Figure 7:
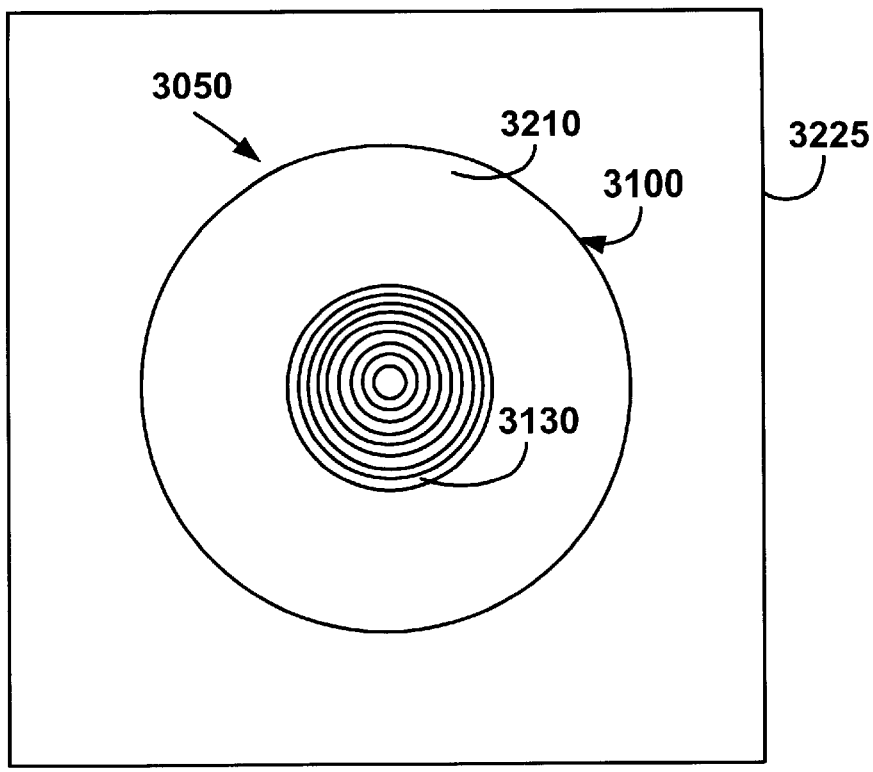
FIG. 7 is a top plan view of the optical focusing device of FIG. 6.
Figure 8:
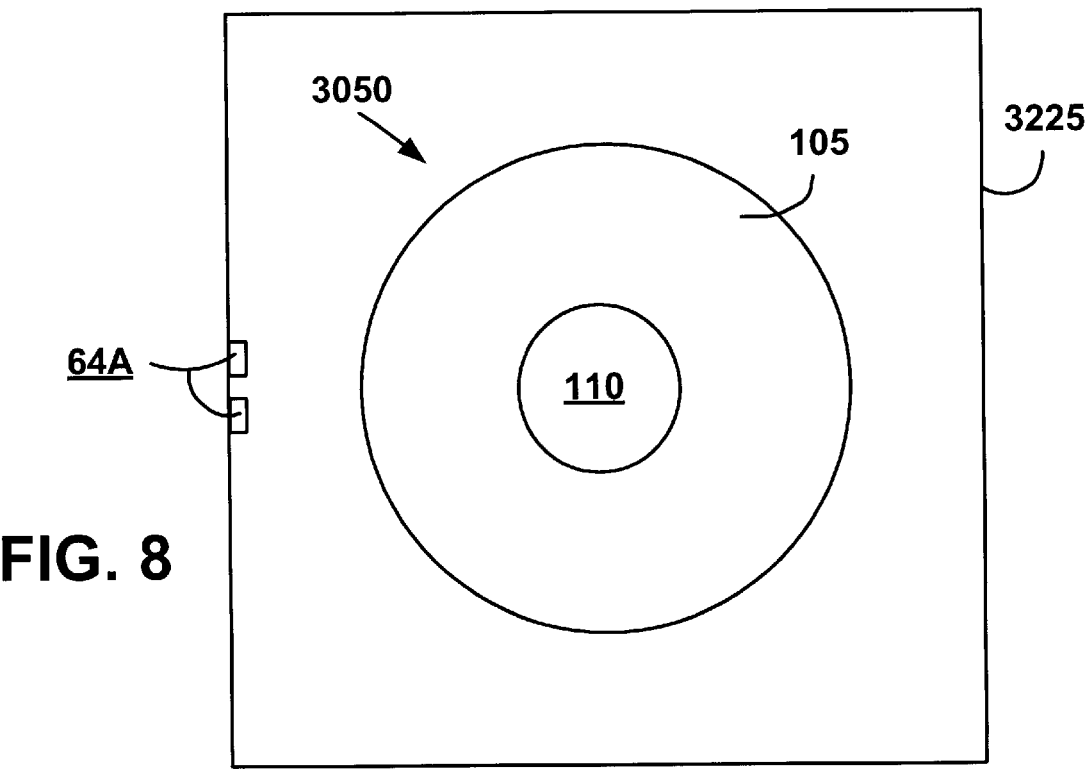
FIG. 8 is a bottom plan view of the optical focusing device of FIG. 7.

With particular reference to FIGS. 7 and 8, the optical focusing device 3050 is generally cylindrically shaped, and is formed within a substrate 3225. The substrate 3225 facilitates the handling of the optical focusing device 3050. The central facet 3130 (FIG. 7) is concentric relative to, and is disposed within the reflective layer 3210.

The pedestal 110 can be generally conically, cylindrically shaped, or it can have a trapezoidal (or another suitable) cross-section, and is co-axially and concentrically disposed relative to the bottom reflective surface 105.

The details of the optical focusing device 2050 (which is a specific example of the optical focusing device 50) will now be described with reference to FIG. 9. The optical focusing device 2050 includes a top surface 2100, a flat bottom reflective surface 105, a pedestal 110, and a body 115. The body 115 is optically transparent, and the top surface 2100 is formed on a first side of the body 115. The bottom reflective surface 105 is formed on a second side of the body 115, with the first and second sides being preferably oppositely disposed. The pedestal 110 is formed on the same side as the bottom reflective surface 105.

The top surface 2100 is comprised of a conically shaped central facet 2130 and a reflective peripheral surface or peripheral reflector 2132. The peripheral reflector 2132 has a curved shape, and can assume a generally aspherical, titled parabolic, tilted elliptical, tilted hyperbolic, or any other suitable shape that optically complements the shape of the central facet 2130 (as it will be explained later), and that focuses the light beam 2135 at the focal point 162.

In a writing or reading mode, the incident optical beam 2135 impinges upon the central facet 2130, and is refracted by it towards the bottom reflective surface 105. The conical shape of the central facet 2130 spreads the incident laser beam 2135 away from the pedestal 110 such that the number of central rays that pass through the central facet 2130 without being reflected by the bottom reflective surface 105 is minimized. This optimizes the focused of the laser beam 2135 and improves the efficiency and performance of the optical focusing device 2050. In one design, the central facet 2130 has a conic constant ranging between approximately −1 and approximately −2, or a conic angle ranging between approximately 20 degrees and 30 degrees.

Figure 9:
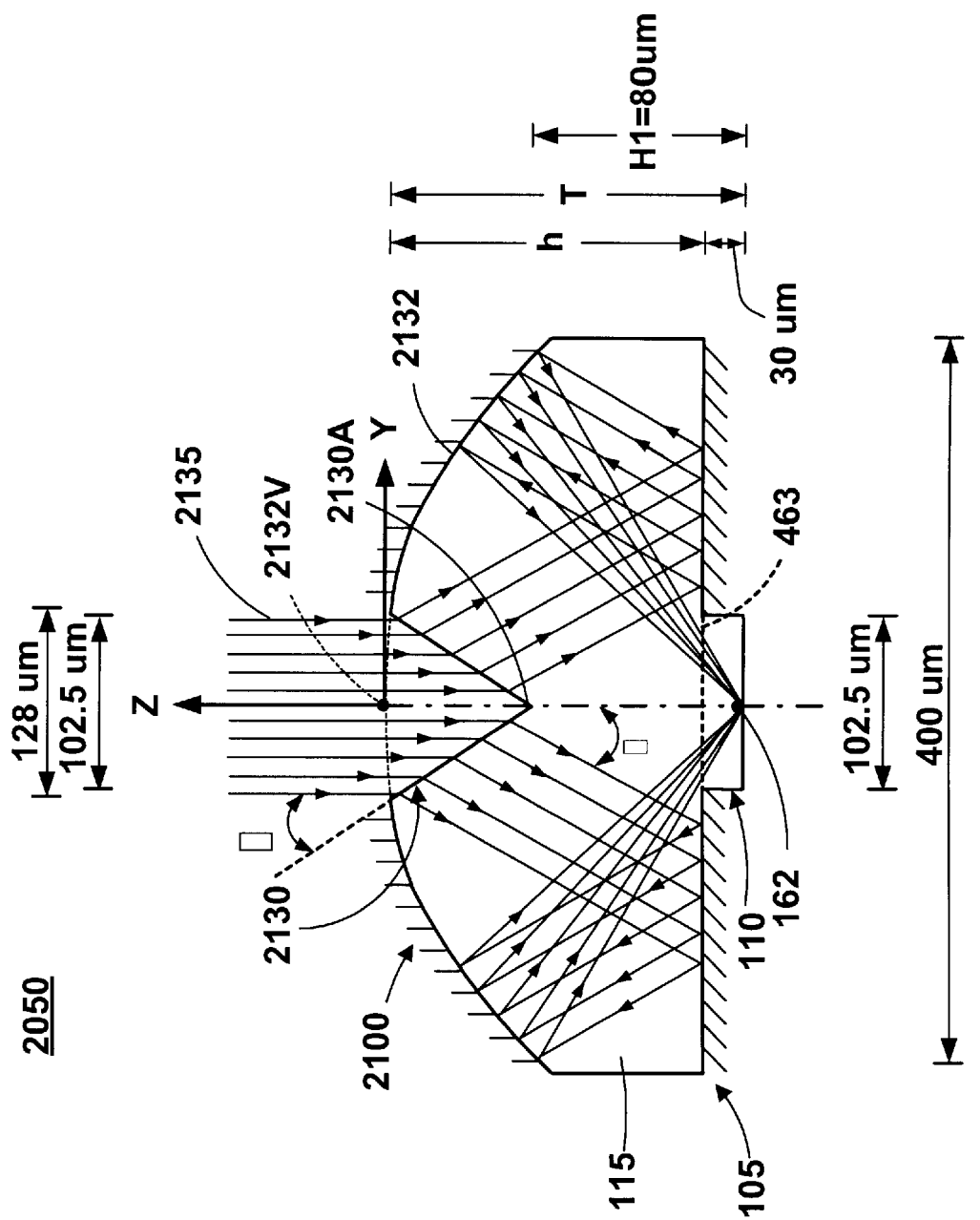
FIG. 9 is an enlarged, side elevational view of yet another optical focusing device forming part of the read/write head of FIGS. 1 and 2, and illustrating a conically shaped incident facet (or surface) for use with a collimated, convergent, or divergent incident beam (the collimated beam is shown as an exemplary embodiment)

In the exemplary embodiment illustrated in FIG. 9, the incident laser beam 2135 is collimated, and passes through the transparent body 115, after being refracted by the central facet 2130, for impinging upon the bottom reflective surface 105. The laser beam 2135 is then reflected, also as a collimated beam, by the bottom reflective surface 105, through the body 115, onto the peripheral reflector 2132. The laser beam 2135 is then either reflected, reflected and refracted, or reflected and diffracted by the peripheral reflector 2132 through the body 115, and is further focused to the focal point 162 located within the pedestal 110 at a focal plane. In a preferred embodiment, the focal point 162 is located along a central axis Z, co-linearly with the apex 2130A of the conically shaped central facet 2130, and the virtual vertex 2132V (shown in dashed line) of the peripheral reflector 2132.

Since the laser beam 2135 remains collimated after it is reflected by the bottom reflective surface 105, the manufacturing tolerance of the height "h" of the optical focusing device 2050 becomes less critical, as the footprint of the laser beam 2135 on the peripheral reflector 2132 remains unchanged. Furthermore, the laser beam 2135 is focused by the peripheral reflector 2132 to give diffraction limited performance (or focused) spot. An advantage of the optical focusing device 2050 is the ability of the peripheral reflector 2132 to compensate for, and to eliminate undesirable aberrations introduced by the central facet 2130.

Even though the incident optical beam 2135 is illustrated as being collimated, it should be understood that the beam 2135 can alternatively be convergent or divergent. However, a change in the angle of incidence of the laser beam 2135 could necessitate a change in the curvature of the peripheral reflector 2132, to compensate for the aberrations introduced by the central facet 2130.

The optical focusing device 2050 provides a relatively high numerical aperture (NA) that can be controlled, as desired, by changing the conic constant of the central facet 2130, and the curvature of the peripheral reflector 2132. According to an exemplary design, the peripheral reflective facet 2132 is substantially aspherically shaped, the function of which can be approximated by the following equation:

$$Z = \frac{CV \cdot r^2}{1 + \sqrt{1 - CV^2(CC+1)r^2}} + a_4 r^4 + a_6 r^6 + a_8 r^8 + a_{10} r^{10},$$

where Z is the function of the aspherical surface; CV is the curvature of the surface, such that (CV=1/r), where r is the radius of the curvature and is defined as follows: $r=(x^2+y^2)^{1/2}$, where x and y represent the coordinates system; CC is the conic constant of the optical focusing device 2050; and $a_4$, $a_6$, $a_8$, and $a_{10}$ are the selected parameters.

Though exemplary dimensions of the optical focusing device 2050 are shown in FIG. 9, it should be clear that these dimensions can be changed, or scaled as desired for the intended applications. Upon scaling the dimensions of the optical focusing device 2050, the above coefficients are varied accordingly, to preserve the functionality of the optical focusing device 2050.

The following are exemplary characteristics and dimensions of the optical focusing device 2050:

The input aperture of the conical central facet 2130 is approximately 128 microns (um) in diameter, for receiving optical beam 2135 with a diameter of approximately 102.5 um.

The height "h" of the optical focusing device 2050, that is the distance between the virtual vertex 2132V and the bottom reflective surface 105, is approximately 187.5 um.

The overall height (T) of the optical focusing device 2050, that is the distance between the virtual vertex 2132V and the focal plane 162P containing the focal spot 162, is approximately 217.5 um.

The distance (H1) between the apex 2130A of the conically shaped central facet 2130 and the focal point 162 is approximately 80 um.

The height of the pedestal 110 is approximately 30 um.

The diameter of the pedestal 110 is approximately the same as that of the optical beam 2135, that is 102.5.

The diameter of the bottom reflective surface 105 is approximately 400 um.

NA is approximately 1.587.

Strehl ratio is approximately 0.997.

The root means square (RMS) optical path difference (OPD) is approximately $0.008\lambda$, where $\lambda$ is the wavelength of the laser beam 2135 and is equal to 650 nm (in this example).

The diffractive limited diameter of the focal spot 162 is approximately 0.257 um.

The conic constant is approximately −1.5.

The spot diameter at power level of $(1/e^2)$ is approximately 0.50 micron.

The spot diameter at full wave at half maximum (FWHM) is approximately 0.23 micron.

The geometric diameter of the focal spot 162 is approximately 0.142 um.

r is approximately 181.90 um.

CC is approximately −1.388485.

$a_4$ is approximately 0.981891.

$a_6$ is approximately −178.515087.

$a_8$ is approximately 6.8108 E+03.

$a_{10}$ is approximately −6.0549 E+04.

According to another embodiment, the curvature of the peripheral reflector 2132 is defined by a tilted parabola that is expressed by the following equation $$Z = -\text{ctg}\,\theta \cdot \rho + \frac{2f \cdot \cos\theta}{\sin^2\theta} - \frac{2f}{\sin^2\theta}\sqrt{1 - \frac{\sin\theta}{f} \cdot \rho},$$

where $\theta$ is the rotation angle of the parabola curve; f is the focus length of the parabola; and $\rho$ is the cylindrical radius (i.e., the distance to the central axis Z).

According to one example with the above curvature, the optical focusing device 2050 has a NA=1.587; a Strehl ratio=0.997; a diffractive limit=0.5 micron; a conic constant of −1.5; a spot diameter at power level of (1e²)=0.50 micron; a spot diameter at full wave at half maximum (FWHM)= 0.23 micron; and a root means square (RMS) optical path difference (OPD)=0.00854λ, where λ is the wavelength of the laser beam 2135 and equals 650 nm.

Preferably, the body 115 is made of a glass material having an index of refraction (n) of about 1.8, that is available from Schott and designated by part number SF57 glass. The central facet 2130 can be coated with anti-reflective (AR) coating.

The design of the optical focusing device 2050 enables the control of the pedestal 110 by optimizing the shape of the peripheral reflector 2132. In a preferred embodiment, the height of the pedestal 110 is reduced so that the overall height (T) of the optical focusing device 2050 is minimized.

In an exemplary embodiment, the curvature of the peripheral reflector 2132 is defined by the following tenth order polynomial equation:

$$Z(r) = -h + \sum_{i=1}^{n} a_i r^i$$

where Z is the function defining the curvature of the peripheral reflector 2132; r is the radius of curvature of the peripheral reflector 2132; h is the optical focusing device thickness (that is the distance between the peripheral reflector 2132 and the bottom reflective surface 105) and n can be set to 10 though a different number of terms can alternatively be selected. The focusing of the optical rays can be optimized using sequence quadratic program and a set of optimized coefficients ($a_i$) are shown in the table below, with the optical focusing device 2050 having the following parameters:

h=1.5 mm.

Pedestal thickness=0.14 mm.

The angle of the rays refracted by the central facet 2130: θ=33.7°.

The depth of the central facet 2130: h1=0.6 mm.

These parameters provide a quick start point for further optimization using optical design software such as OSLO™.

surface 2300 (FIG. 10), and includes a central facet 2330 that is negatively lensed, for example with a convex shape, to further complement the peripheral reflector 2132 and to increase the flexibility of the focal spot adjustment.

Figure 11:
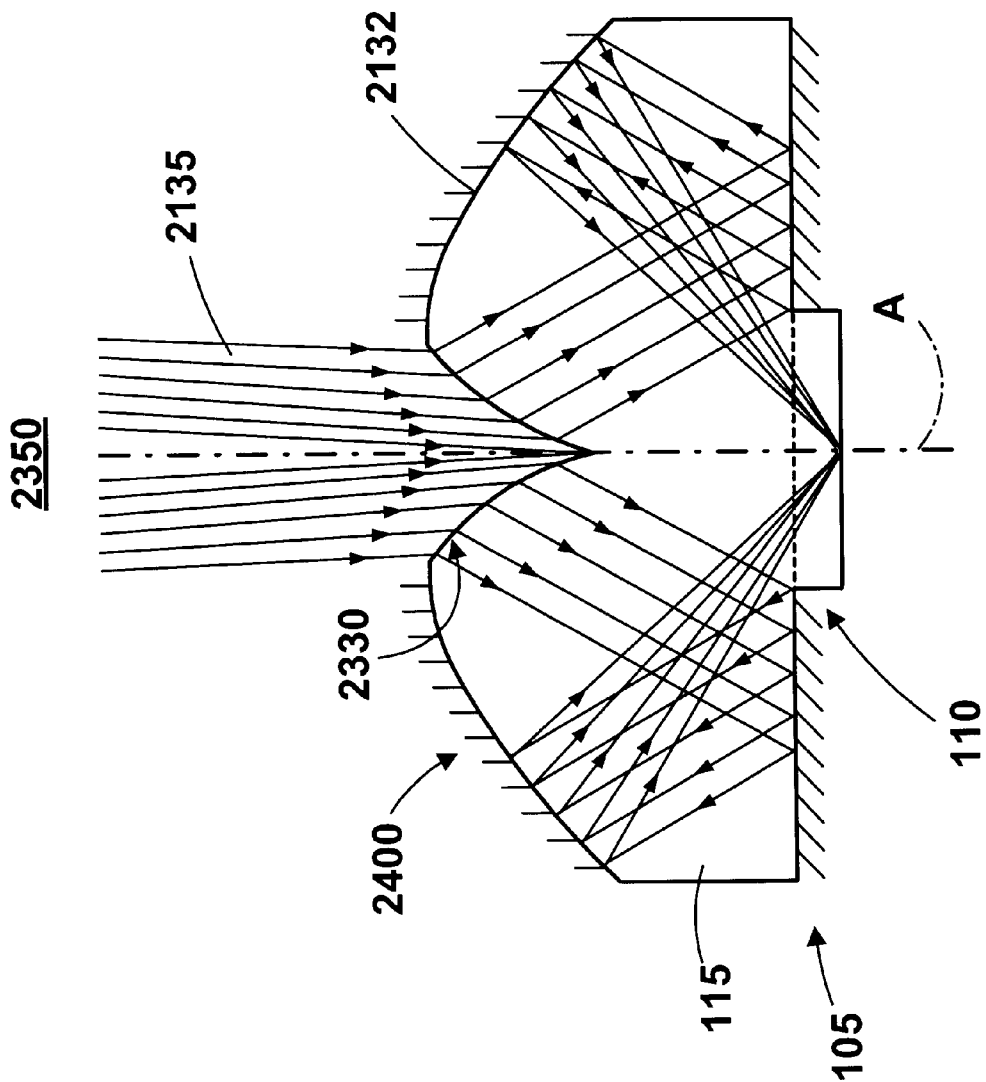
FIG. 11 is an enlarged, side elevational view of another optical focusing device forming part of the read/write head of FIGS. 1 and 2, illustrating a negatively lensed incident facet for use with a collimated, convergent, or divergent incident beam (the convergent beam is shown as an exemplary embodiment)
Figure 12:
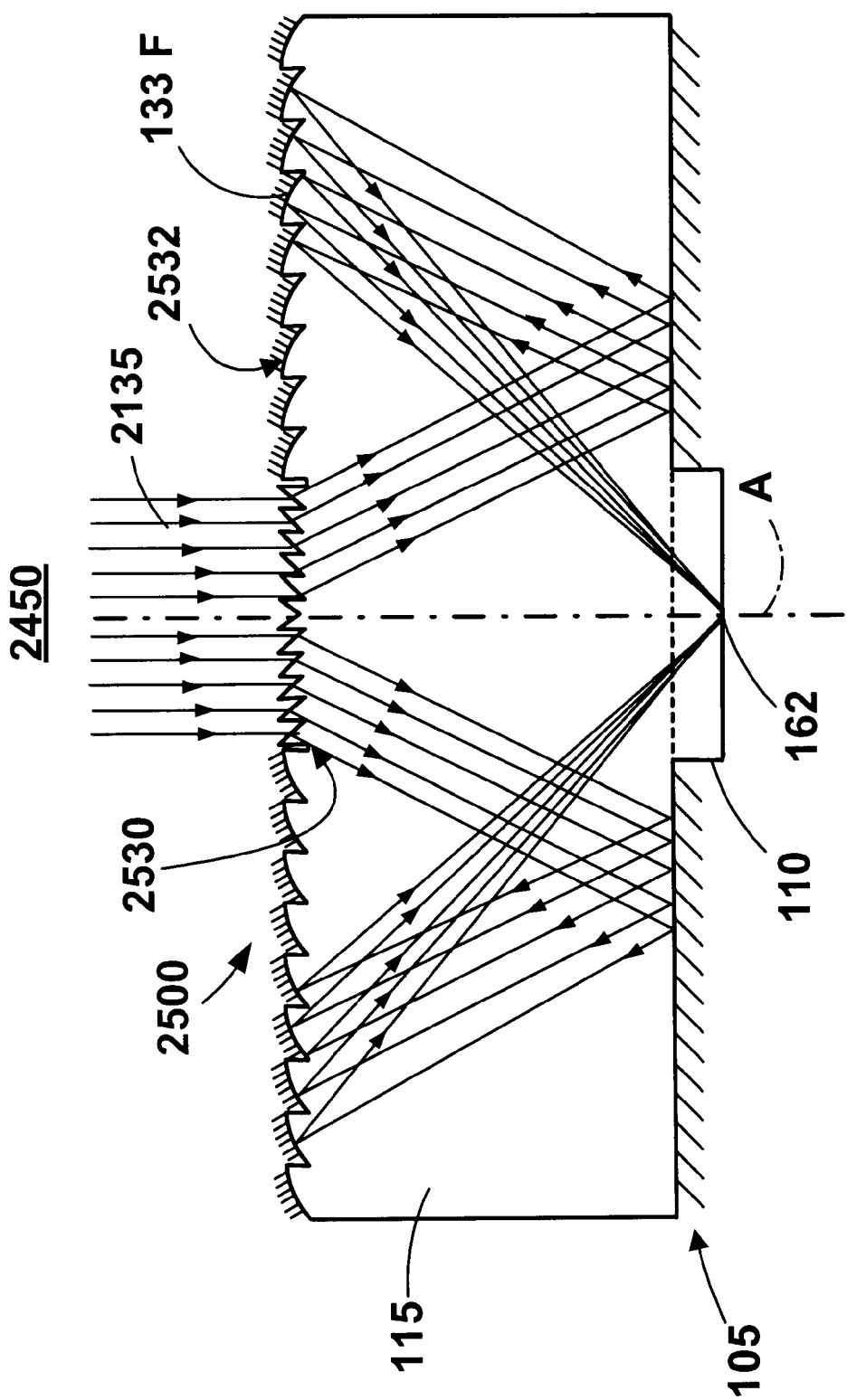
FIG. 12 is an enlarged, side elevational views of another optical focusing device forming part of the read/write head of FIGS. 1 and 2, and illustrating a conically shaped incident facet and a generally flat peripheral reflector that can be made, for example, as a diffractive optical element or as a Fresnel lens.

FIG. 12 illustrates an optical focusing device 2450 that is generally similar in function to the optical focusing devices previously described, for example 50 (FIG. 6) and 2050 (FIG. 9), and that includes a top surface 2500, a bottom reflective surface 105, a pedestal 110, and a body 115. The top surface 2500 includes a central facet 2530, and a peripheral reflector 2532 that are generally flat and that can be made of a diffractive optical element or a Fresnel lens, and that provide similar phase profiles as those of the central facets 2130, 2230, 2330 and the peripheral reflector 2132 of FIGS. 9–11.

FIG. 13 illustrates the optical focusing device 2450 of FIG. 12, as modeled by the OSLO™ optical design software for the diffractive optical element of the central facet 3130 (FIG. 6), and of the peripheral reflector 3132.

With further reference to FIG. 14, the peripheral reflector 2532 is formed of a pattern of stepped, diffractive micro-structures or micro-gratings 4000. The micro-structures 4000 are coated with a reflective layer 3610 (FIG. 13). For illustration purpose only, each micro-grating 4000 is approximately 0.65 micron wide and approximately 0.45 micron high. The micro-structures 4000 can be identical and periodic, or, alternatively, they can have different, aperiodic shapes.

With further reference to FIG. 15, the central facet 3130 is formed of a pattern of stepped, diffractive micro-structures or micro-gratings 4100. These micro-structures 4100 diffract the light beam away from the pedestal 110. For illustration purpose only, each micro-grating 4100 is approximately 0.26 micron wide and approximately 0.45 micron high. The micro-structures 4100 can be identical and periodic, or, alternatively, they can have different, aperiodic shapes.

As an example, the phase distribution function Φ(r) of the central facet 2530 is defined by the following equation:

$$\Phi(r) = -\frac{2\pi}{\lambda} r$$

The phase distribution function Φ(r) of the peripheral reflector 2532 is defined by the following equation:

TABLE

| Coefficients ($a_i$) | | | | | |
|---|---|---|---|---|---|
| $a_0$ | $a_1$ | $a_2$ | $a_3$ | $a_4$ | $a_5$ |
| −1.500000E+00 | 3.028703E−01 | 1.664223E−01 | 3.073437E−02 | 7.094915E−03 | 1.834375E−03 |
| $a_6$ | $a_7$ | $a_8$ | $a_9$ | $a_{10}$ | |
| 5.081502E−04 | 1.474686E−04 | 4.425534E−05 | 1.362157E−05 | 4.276505E−06 | |

Figure 10:
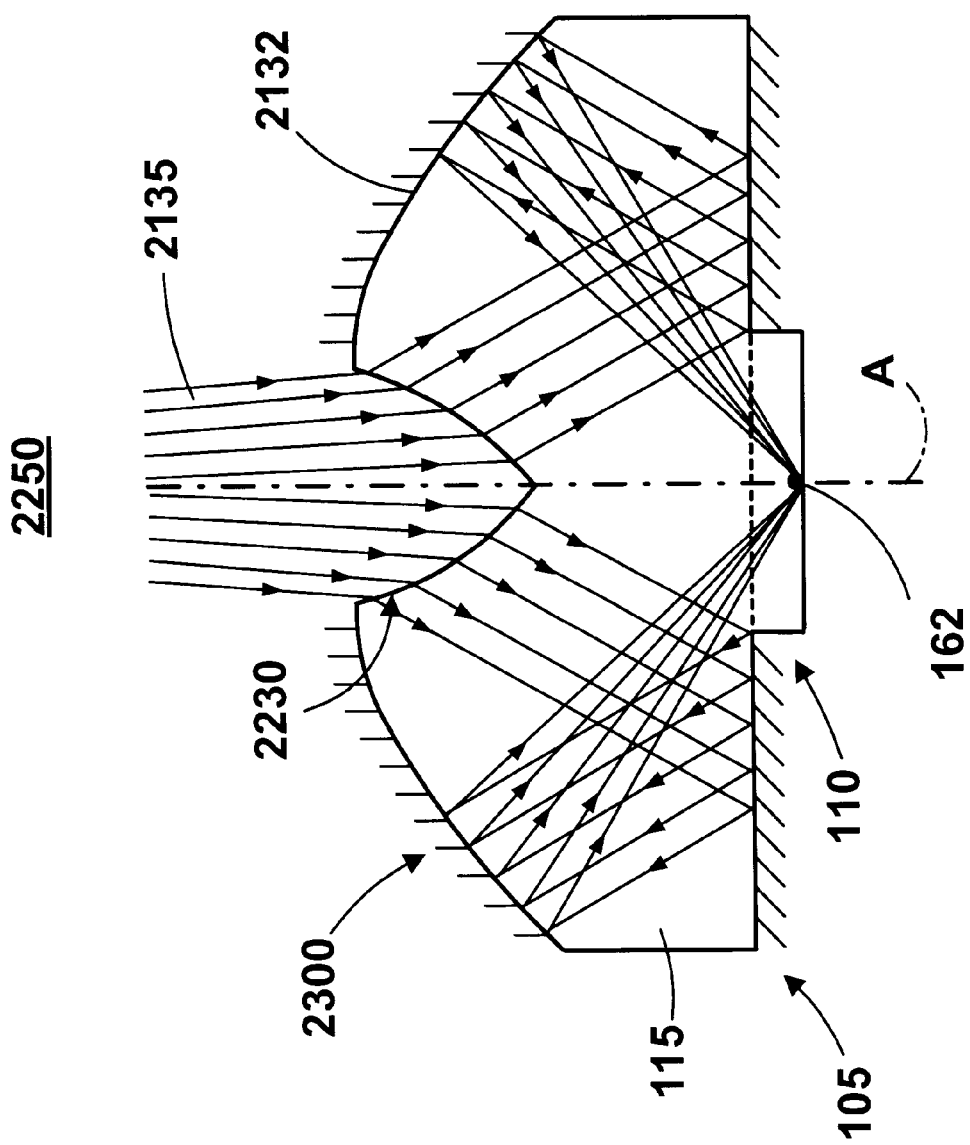
FIG. 10 is an enlarged, side elevational view of another optical focusing device forming part of the read/write head of FIGS. 1 and 2, illustrating a positively lensed incident facet for use with a collimated, convergent, or divergent incident beam (the divergent beam is shown as an exemplary embodiment)

FIG. 10 illustrates an optical focusing device 2250 that is generally similar in function to the optical focusing device 2050 (FIG. 9), and that includes a top surface 2300, a bottom reflective surface 105, a pedestal 110, and a body 115. The top surface 2300 is generally similar to the top surface 2130 (FIG. 9), and includes a central facet 2230 that is positively lensed, for example with a concave shape, to further complement the peripheral reflector 2132 and to increase the flexibility of the focal spot adjustment.

FIG. 11 illustrates an optical focusing device 2350 that is generally similar in function to the optical focusing device 2250 (FIG. 10), and that includes a top surface 2400, a bottom reflective surface 105, a pedestal 110, and a body 115. The top surface 2400 is generally similar to the top $$\Phi(r) = \frac{2\pi}{\lambda}(a_1 r + a_2 r^2 + a_3 r^3 + a_4 r^4),$$

where $r = \left|\sqrt{x^2 + y^2}\right|$;

and $a_1$ is approximately 0.848330; $a_2$ is approximately 7.440246; $a_3$ is approximately −15.700477; and $a_4$ is approximately 14.359795.

The dimensions of an exemplary optical focusing device 2450 shown in FIG. 13 are as follows:

The diameter of the central facet 2530 is approximately 123 um.

The height of the body 115, that is the distance between the top surface 2500 and the bottom reflective surface 105 is approximately 130 um.

The overall height of the optical focusing device 2450, that is the distance between the top surface 2500 and the focal plane containing the focal spot 162, is approximately 170 um.

The height of the pedestal 110 is approximately 40 um.

The diameter of the pedestal 110 is approximately 123 um.

The diameter of the bottom reflective surface 105 is approximately 450 um.

NA is approximately 1.448.

Strehl ratio is approximately 1.

The diffractive-limited radius of the focal spot is approximately 0.273 um.

The spot size diameter at full wave at half maximum (FWHM) is approximately 0.25 micron.

The geometric spot size radius of the focal spot 162 is approximately 0.01 um.

In another alternative embodiment according to the present invention, the central facet, for example 2130 (FIG. 9), 2230 (FIG. 10), 2330 (FIG. 11), or 2530 (FIG. 13) can be provided with a holographic optical element.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment. For example, refractive or diffractive gratings can be added to the bottom reflective surface, as explained herein in connection with the top surface. The use of the optical focusing device is not limited to data storage devices, as it can be used in various other optical applications, including but not limited to high resolution microscopy, surface inspection, and medical imaging.

What is claimed is:

1. An optical data storage system comprising:
    an optical focusing device for focusing an incident optical beam to a focal spot, comprising:
        a top surface comprised of a peripheral reflector and a central facet upon which the optical beam impinges;
        a body through which the incident optical beam passes;
        a bottom reflective surface for reflecting the optical beam through said body toward said peripheral reflector;
        a pedestal extending from said bottom reflective surface for defining a focal plane on which the focal spot is formed;
        said peripheral reflector focusing the optical beam reflected from the bottom reflective surface to the focal spot; and
        said central facet being generally conically shaped;
        wherein the beam is any of: a collimated, convergent, or divergent beam;
        wherein said central facet refracts the incident optical beam away from said pedestal, onto said bottom reflective surface;
        wherein said central facet is optically refractive; and
        wherein the incident optical beam is refracted by said central facet as a generally collimated beam with a donut shaped cross-section.

2. An optical data storage system according to claim 1, wherein said peripheral reflector has a curved shape.

3. An optical data storage system according to claim 1, wherein said peripheral reflector is generally flat.

4. An optical data storage system according to claim 1, wherein said peripheral reflector is generally aspherically shaped.

5. An optical data storage system according to claim 1, wherein said peripheral reflector has a generally parabolic shape.

6. An optical data storage system according to claim 1, wherein said peripheral reflector has any of: a generally tilted hyperbolic, titled tilted parabolic, or tilted elliptical shape.

7. An optical data storage system according to claim 1, wherein said central facet is any of: positively or negatively lensed.

8. An optical data storage system according to claim 1, wherein a diffractive microstructure provides a phase distribution function Φ(r) of said central facet is defined by the following equation:

$$\Phi(r) = -\frac{2\pi}{\lambda}r; \text{ and}$$

wherein a phase distribution function Φ(r) of said peripheral reflector is defined by the following equation:

$$\Phi(r) = \frac{2\pi}{\lambda}(a_1 r + a_2 r^2 + a_3 r^3 + a_4 r^4),$$

$$\text{where } r = |\sqrt{x^2 + y^2}|;$$

where r is the radius of the curvature; x and y represent the coordinates system and λ is the wavelength of the optical beam; $a_1$ is approximately 0.848330; $a_2$ is approximately 7.440246; $a_3$ is approximately −15.700477; and $a_4$ is approximately 14.359795.

9. An optical data storage system according to claim 1, wherein a surface of said peripheral reflector is defined by a tilted parabola expressed by the following equation $$Z = -\text{ctg }\theta \cdot \rho + \frac{2f \cdot \cos\theta}{\sin^2\theta} - \frac{2f}{\sin^2\theta}\sqrt{1 - \frac{\sin\theta}{f}\cdot\rho},$$

where θ is the rotation angle of the parabola curve; f is a focus length of the parabola; and ρ is the radius along a coordinate axis Z.

10. An optical data storage system according to claim 1, wherein said bottom reflective surface is reflective; and
    wherein the beam refracted by said central facet is reflected by said bottom reflective surface as a collimated beam onto said peripheral reflector.

11. An optical data storage system according to claim 1, wherein the beam reflected by said bottom reflective surface impinges upon said peripheral reflector; and
    wherein said peripheral reflector is any of: reflective; reflective and refractive; or reflective and diffractive.

12. An optical data storage system according to claim 1, wherein said central facet defines an apex; and
    wherein the focal spot is co-aligned with said apex along a central axis.

13. An optical data storage system according to claim 1, wherein said peripheral reflector compensates for conical factors introduced by said central facet.

14. An optical data storage system according to claim 1, wherein a surface of said peripheral reflector is substantially aspherically shaped, the function of which is approximated by the following equation:

$$Z = \frac{CV \cdot r^2}{1 + \sqrt{1 - CV^2(CC+1)r^2}} + a_4 r^4 + a_6 r^6 + a_8 r^8 + a_{10} r^{10},$$

where Z is the function of the aspherical surface; CV is the curvature of the surface, such that (CV=1/r), where r is the radius of the curvature and is defined as follows: $r=(x^2+y^2)^{1/2}$, where x and y represent the coordinates system; CC is the conic constant of the optical focusing device; and $a_4$, $a_6$, $a_8$, and $a_{10}$ are polynomial parameters.

15. An optical data storage system according to claim 1, wherein said central facet is coated with an anti-reflective (AR) coating.

16. An optical data storage system according to claim 1, wherein said surface of said peripheral reflector is optimized for minimal focal spot size by means of an iterative process.

17. An optical data storage system according to claim 16, wherein said iterative process includes a plurality of iterations using pre-defined polynomial coefficients in the following equation:

$$Z(r) = -h + \sum_{i=1}^{n} a_i r^i$$

where Z is the function defining the curvature of said peripheral reflector; r is the radius of curvature of said peripheral reflector.

18. An optical data storage system according to claim 17, wherein said iterative process includes using a Sequential Quadratic Program (SQP).

19. An optical data storage system comprising:
an optical focusing device for focusing an incident optical beam to a focal spot, comprising:
a top surface comprised of a peripheral reflector and a central facet upon which the optical beam impinges;
a body through which the incident optical beam passes;
a bottom reflective surface for reflecting the optical beam through said body toward said peripheral reflector;
a pedestal extending from said bottom reflective surface for defining a focal plane on which the focal spot is formed;
said peripheral reflector focusing the optical beam reflected from the bottom reflective surface to the focal spot; and
said central facet being generally conically shaped;
wherein said top surface includes a peripheral reflector that is generally flat and that has a patterned grating profile; and
wherein said patterned grating profile includes a non-periodic distribution of gratings.

20. An optical data storage system according to claim 19, wherein said peripheral reflector has any one or more of: a generally curved shape; a generally flat shape; a generally aspherical shape; a generally parabolic shape; a generally hyperbolic shape, a generally tilted parabolic shape; or a generally elliptical shape.

21. An optical data storage system according to claim 19, wherein said central facet is any of: positively or negatively lensed.

22. An optical data storage system according to claim 19, wherein said bottom reflective surface is reflective; and
wherein the beam refracted by said central facet is reflected by said bottom reflective surface as a collimated beam onto said peripheral reflector.

23. An optical data storage system according to claim 19, wherein the beam reflected by said bottom reflective surface impinges upon said peripheral reflector; and
wherein said peripheral reflector is any of: reflective; reflective and refractive; or reflective and diffractive.

24. An optical data storage system comprising:
an optical focusing device for focusing an incident optical beam to a focal spot, comprising:
a top surface comprised of a peripheral reflector and a central facet upon which the optical beam impinges;
a body through which the incident optical beam passes;
a bottom reflective surface for reflecting the optical beam through said body toward said peripheral reflector;
a pedestal extending from said bottom reflective surface for defining a focal plane on which the focal spot is formed;
said peripheral reflector focusing the optical beam reflected from the bottom reflective surface to the focal spot; and
said central facet being generally conically shaped;
wherein said central facet includes a holographic optical element.

25. An optical data storage system according to claim 24, wherein said peripheral reflector has any one or more of: a generally curved shape; a generally flat shape; a generally aspherical shape; a generally parabolic shape; a generally hyperbolic shape, a generally tilted parabolic shape; or a generally elliptical shape.

26. An optical data storage system according to claim 24, wherein said central facet is any of: positively or negatively lensed.

27. An optical data storage system according to claim 24, wherein said bottom reflective surface is reflective; and
wherein the beam refracted by said central facet is reflected by said bottom reflective surface as a collimated beam onto said peripheral reflector.

28. An optical data storage system according to claim 24, wherein the beam reflected by said bottom reflective surface impinges upon said peripheral reflector; and
wherein said peripheral reflector is any of: reflective; reflective and refractive; or reflective and diffractive.

29. An optical data storage system comprising:
an optical focusing device for focusing an incident optical beam to a focal spot, comprising:
a top surface comprised of a peripheral reflector and a central facet upon which the optical beam impinges;
a body through which the incident optical beam passes;
a bottom reflective surface for reflecting the optical beam through said body toward said peripheral reflector;
a pedestal extending from said bottom reflective surface for defining a focal plane on which the focal spot is formed;
said peripheral reflector focusing the optical beam reflected from the bottom reflective surface to the focal spot; and
said central facet being generally conically shaped;
wherein said top surface includes a generally flat central facet and a generally flat peripheral reflector;
wherein said peripheral reflector is formed of a pattern of stepped, diffractive micro-structures that are coated with a reflective layer; and
wherein said central facet is formed of a pattern of stepped, diffractive micro-structures.

30. An optical data storage system according to claim 29, wherein said central facet is any of: positively or negatively lensed.

31. An optical data storage system according to claim 29, wherein said bottom reflective surface is reflective; and wherein the beam refracted by said central facet is reflected by said bottom reflective surface as a collimated beam onto said peripheral reflector.

32. An optical data storage system according to claim 29, wherein the beam reflected by said bottom reflective surface impinges upon said peripheral reflector; and wherein said peripheral reflector is any of: reflective; reflective and refractive; or reflective and diffractive.

33. An optical data storage system according to claim 29, wherein said peripheral reflector has any one or more of: a generally curved shape; a generally flat shape; a generally aspherical shape; a generally parabolic shape; a generally hyperbolic shape, a generally tilted parabolic shape; or a generally elliptical shape.

34. An optical data storage system comprising:

an optical focusing device for focusing an incident optical beam to a focal spot, comprising:
 a top surface comprised of a peripheral reflector and a central facet upon which the optical beam impinges;
 a body through which the incident optical beam passes;
 a bottom reflective surface for reflecting the optical beam through said body toward said peripheral reflector;
 a pedestal extending from said bottom reflective surface for defining a focal plane on which the focal spot is formed;
 said peripheral reflector focusing the optical beam reflected from the bottom reflective surface to the focal spot; and
 said central facet being generally conically shaped;
 wherein said bottom reflective surface includes any of a refractive or diffractive grating.

35. An optical data storage system according to claim 34, wherein said peripheral reflector has any one or more of: a generally curved shape; a generally flat shape; a generally aspherical shape; a generally parabolic shape; a generally hyperbolic shape, a generally tilted parabolic shape; or a generally elliptical shape.

36. An optical data storage system according to claim 34, wherein said central facet is any of: positively or negatively lensed.

37. An optical data storage system according to claim 34, wherein said bottom reflective surface is reflective; and wherein the beam refracted by said central facet is reflected by said bottom reflective surface as a collimated beam onto said peripheral reflector.

38. An optical data storage system according to claim 34, wherein the beam reflected by said bottom reflective surface impinges upon said peripheral reflector; and wherein said peripheral reflector is any of: reflective; reflective and refractive; or reflective and diffractive.

* * * * *